F. H. LINDENBERG.
CENTRIFUGAL SEPARATOR.
APPLICATION FILED MAR. 8, 1917.

1,395,193.

Patented Oct. 25, 1921.
3 SHEETS—SHEET 3.

WITNESSES:

INVENTOR.
BY
ATTORNEY.

UNITED STATES PATENT OFFICE.

FRANK H. LINDENBERG, OF COLUMBUS, OHIO, ASSIGNOR TO THE JEFFREY MANUFACTURING COMPANY, OF COLUMBUS, OHIO, A CORPORATION OF OHIO.

CENTRIFUGAL SEPARATOR.

1,395,193.      Specification of Letters Patent.      Patented Oct. 25, 1921.

Application filed March 8, 1917. Serial No. 153,423.

*To all whom it may concern:*

Be it known that I, FRANK H. LINDENBERG, a citizen of the United States, residing at Columbus, in the county of Franklin and the State of Ohio, have invented certain new and useful Improvements in Centrifugal Separators, of which the following is a specification, reference being had therein to the accompanying drawing.

The present invention relates to certain new and useful improvements in centrifugal separators, and especially to continuously acting separators adapted to separate liquids from finely divided solid material.

It is the especial object of this invention to provide a separator of the class described having a perforated basket adapted to rotation about a vertical axis and provided with retarding devices to prevent the movement of the material through the apparatus too rapidly to accomplish the extraction of the desired proportion of the contained moisture.

A further object is to provide improved transmission mechanism whereby the several elements of the machine shall be propelled at speeds appropriate to the action desired.

A further object is to provide improved mounting for the apparatus whereby the rotating parts will be enabled to find a center of rotation to produce the perfect balance necessary for continued operation.

The devices by which I accomplish these objects are fully set forth in the following specification and illustrated in the accompanying drawings of which—

Like numerals refer to similar parts in the several figures.

Figure 1:
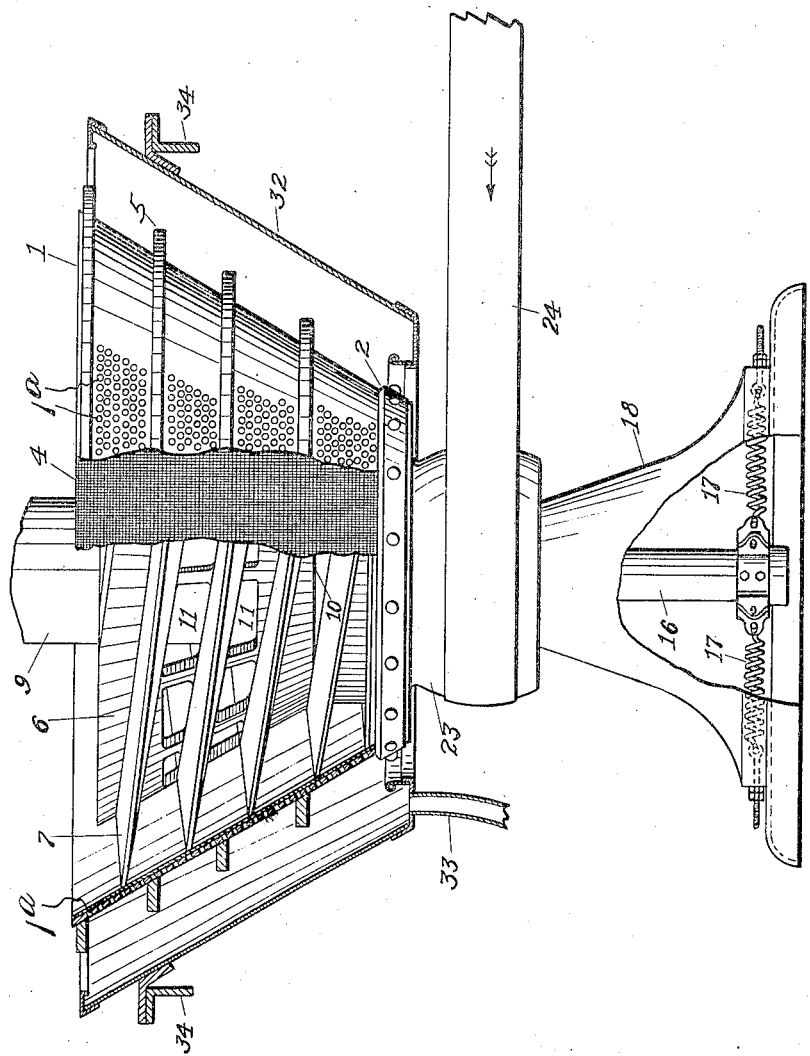
Figure 1 is a side elevation, certain parts being broken away to reveal other parts.

As illustrated in the drawings, my improved separator consists, essentially, of an upwardly flaring perforated conical basket, adapted to rotation about a vertical axis, into which the material to be treated is introduced in a continuous stream, and from which the liquids are thrown, by centrifugal action, through the perforations of the basket, while the tendency of the solids to climb on the inclined surface of the basket causes their discharge over its upper edge, this tendency to upward movement being controlled by a retarding device adapted to retain the material in the basket during a sufficient period of time to extract the desired proportion of moisture.

Figure 2:
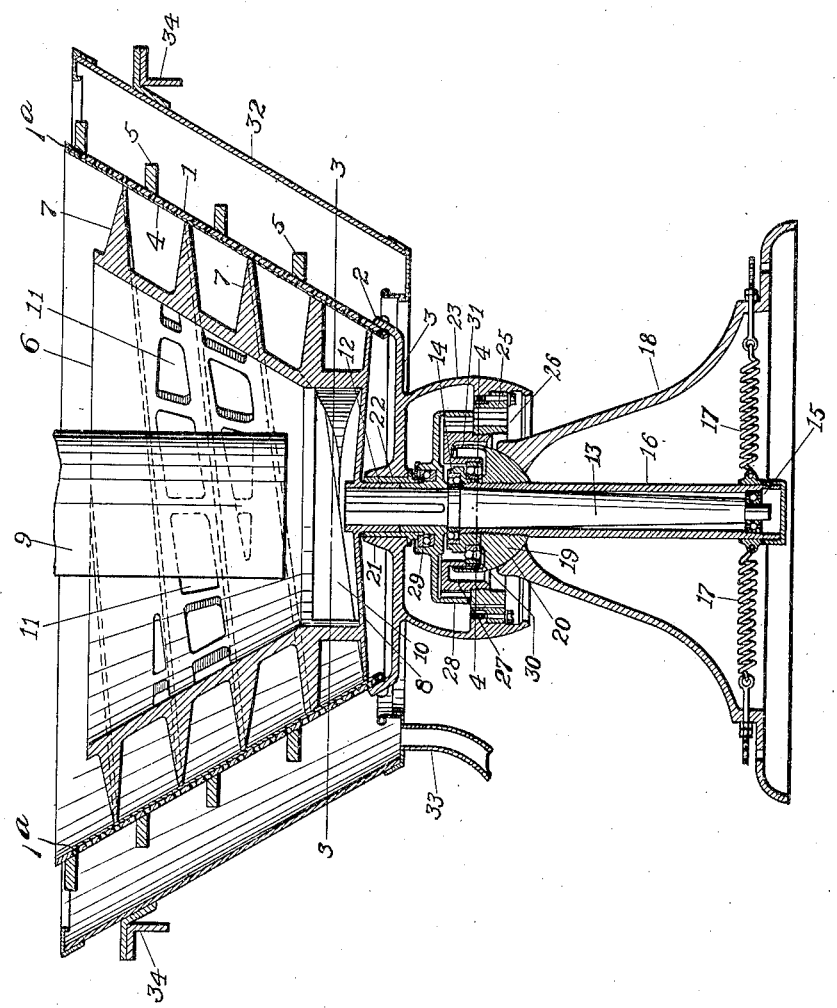
Fig. 2 is a central vertical cross section of the machine.
Figure 3:
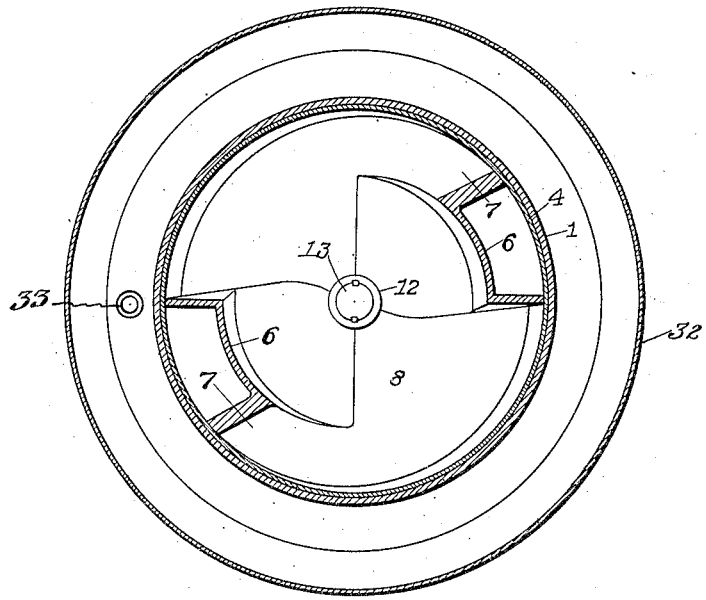
Fig. 3 is a horizontal cross section taken along the line 3—3 of Fig. 2.
Figure 4:
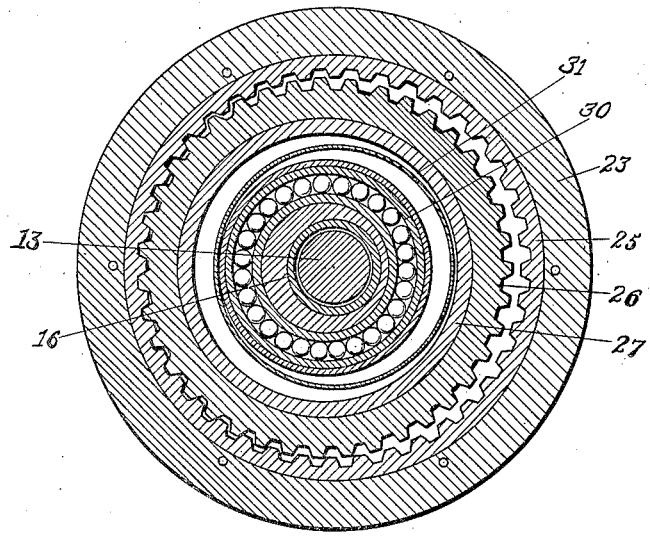
Fig. 4 is a cross section taken along the line 4—4 of Fig. 2.

The separator basket consists of an upwardly flaring truncated cone 1 of perforated sheet metal, attached at its lower edge to the upturned flange 2 of the bottom plate 3. Upon its inner surface is a lining 4 of wire mesh of sufficient fineness to prevent the escape of the finely divided solid material from which the liquids are being extracted. The perforations in the cone 1 are shown at 1ª and although, not delineated in detail, it will be understood that they extend continuously around the cone as partially indicated in Fig. 1, and also in section in said figure and in Fig. 2. A plurality of annular rings 5 attached to its outer surface, serve to reinforce the perforated metal to prevent distortion of the basket under the strains of service. Centrifugal action, caused by the rapid rotation of the basket 1 tends to move material upon its inner surface upwardly to be discharged over its upper edge. To retain the material in the basket for a sufficient period of time to effect the extraction of the desired proportion of the contained liquids, I have provided a retarding device consisting of a metallic cone 6 the sides of which are concentric with and spaced apart from the separator basket 1. Upon the outer surface of the cone 6 are formed spiral vanes 7 which extend outwardly to contact with the basket lining 4 to intercept the upward movement of the material upon the wall of the basket. At its lower edge the cone 6 is attached to a circular plate 8 upon which the material is received from the spout 9 and by the rapid rotation of which it is projected toward the side of the basket 1, passing through the apertures 10 of the cone 6. Relatively large apertures 11 are formed in the inner cone 6 in transverse horizontal planes above the bottom. The retarding vanes 7 revolve in the same direction as the separator basket 1 but at a slightly slower speed producing a screw action of the flights relative to the basket which permits the gradual upward movement of the material. The velocity of this upward movement depends upon the relative speeds of the two elements. Formed at the center of the bottom plate 8 is a hub 12 which is fixed to the upper end of a vertical shaft 13 journaled in the ball bearings 14 and 15 within the vertical sleeve 16. To the lower end of the sleeve 16 is attached a plurality of tension springs 17 extending radially therefrom and attached to the pedestal casting 18 to resiliently maintain the sleeve 16 in its upright central position. At the upper end of the sleeve 16 is a hemispherical expansion 19 which serves as the ball element bearing in the socket 20 of the pedestal casting 18 to form a ball and socket support for the rotative parts of the separator. At the center of the bottom plate 3 of the separator basket is a hub 21 within which is formed a journal bearing 22 adapted to free rotation upon the outer surface of the hub 12 of the retarding element. An annular flange depending from the plate 3 concentric with the shaft 13 forms a pulley 23 of spherical contour the center of curvature of which is coincident with the center of the ball 19 and socket 20. Power to drive the separator is applied to the pulley 23 through a suitable belt 24 from any convenient source of power.

The irregularity of distribution and the movement of material in the basket produces a constant shifting of the center of gravity of the basket, tending, at the high rotative speed required in such service, to set up vibrations which would soon destroy the machine. The universal flexibility of the ball and socket support upon the pedestal 19, in conjunction with the balancing effect of the tension springs 17, permit the rotative parts to adjust themselves to the constantly shifting center of gravity, tending to find for themselves the true center of balance, while the spherical form of the pulley 23 and the coincidence of its center with the center of the ball and socket support prevents the disturbance of the balance of the rotative parts of the machine by the tension of the belt 24.

The retarding action of the spiral vanes 7 is inversely proportional to the difference in the speeds of the basket and the vanes, and I have provided a compact and convenient gear train, which is contained within the pulley 23, by which the retarding element is positively driven at a speed bearing the desired relation to that of the basket. Attached to the pulley 23 is a ring 25 upon the inner face of which is formed gear teeth adapted for engagement with similar teeth formed upon the outer surface of a ring 26. The ring 26 is attached to a gear ring 27 having teeth upon its outer face which are adapted for engagement with the teeth on the inner face of a gear ring 28 carried by the hub 29 fixed to the shaft 13. The gear rings 26 and 27 are journaled upon a ball bearing 30 mounted upon the ball 19 of the ball and socket support and sufficiently eccentric to the shaft 13 to cause the engagement of the teeth of the external gears with their respective internal gears to transmit power from the pulley 23 to the shaft 13. An upstanding flange 31 on the bearing ball 19 serves to retain the lubricant in the ball bearings 14 and 30 and to protect them from dust. A stationary jacket 32 surrounding the basket 1 receives the liquids thrown off by the basket, which liquids are conducted through a suitable spout 33 to any convenient receptacle. The jacket 32 may be supported in any preferred manner independently of the rotating parts of the separator, as for example by the angle bars 34. The material discharged over the top of the basket 1 is thrown beyond the upper edge of the jacket 32 and may be received by any preferred device the character of which depends entirely upon the character of the material which is being treated. As such devices form no part in the present invention it is not thought to be necessary to specify them at this time.

The material initially introduced through the chute 9 is received directly in the lower end of the inner cone. Unless introduced with delicate regulation it tends to reach the outward flaring or conical interior surface, although expected to normally pass outward through the apertures 10. Should any of this material, under the high centrifugal force, tend to travel upward on the inner surface of the inner cone, it escapes through the apertures at 11 and is prevented from being thrown out at the top and caused to pass upward in the space between the cones. These apertures also permit the introduction of jets of water to cleanse the lining 4 and remove material from it, should any adhere thereto, as will occur under certain conditions of operation.

As the proportion of the liquids extracted from the solids is dependent upon the length of time the material is exposed to the centrifugal action of the basket, which time varies inversely as the difference between the speeds of the retarding vanes and that of the basket, gears of any desired ratio may be used to adapt the machine to different sorts of material and to the production of different qualities of product.

What I claim is—

1. In a separator of the class described, the combination of an upwardly flaring conical perforated basket adapted to revolve about a vertical axis and mounted for universal rotation about a center in said axis, spiral vanes within the basket arranged to revolve differentially in the same direction as the basket to control the upward movement of material upon the surface of the basket, and means acting in the transverse plane of said center of rotation to cause the revolution of the basket and the vanes at speeds bearing a definite ratio.

2. In a separator of the class described, the combination of an upwardly flaring conical perforated basket adapted to revolve about a vertical axis and mounted for universal rotation about a center in said axis, spiral vanes within the basket arranged to revolve in the same direction as the basket but at less speed to control the upward movement of the material upon the surface of the basket, and means acting in the transverse plane of said center of rotation to cause the revolution of the basket and the vanes at speeds bearing a definite ratio.

3. In a separator of the class described, the combination of an upwardly flaring conical perforated basket adapted to revolve about a vertical axis and mounted for universal rotation about a center in said axis, spiral vanes within the basket arranged to revolve differentially in the same direction as the basket to control the upward movement of material upon the surface of the basket, means acting in the transverse plane of said center of rotation to revolve the basket, and gearing positively connecting the basket and the spiral vanes to revolve the said vanes at a speed having a positive ratio to that of the basket.

4. In a separator of the class described, the combination of an upwardly flaring conical perforated basket adapted to revolve about a vertical axis and mounted for universal rotation about a center in said axis, spiral vanes within the basket adapted to revolve in the same direction as the basket but at less speed to control the upward movement of material upon the surface of the basket, means acting in the transverse plane of said center of rotation to revolve the basket, and gearing positively connecting the basket and the spiral vanes to revolve the said vanes at a speed having a positive ratio to that of the basket.

5. In a separator of the class described, the combination of an upwardly flaring conical perforated basket adapted to revolve about a vertical axis and supported for universal rotation about a center in said axis, spiral vanes within the basket arranged to revolve differentially with respect to the revolution of the basket to control the upward movement of material upon the surface of the basket, a pulley attached to the basket concentric with said center of rotation adapted to receive a single belt for imparting power in the transverse plane of said center of rotation, and gearing within the pulley positively connecting the basket and the vanes to revolve said vanes at a speed having a positive ratio to that of the basket.

6. In a separator of the class described, the combination of an upwardly flaring conical perforated basket adapted to revolve about a vertical axis, a concentric shell within the basket adapted to receive the material under treatment directly in the chamber at its lower end, and in a mass contacting with the interior conical surface, and said shell having spiral vanes to control the upward movement of the material along the surface of the basket, and having relatively large apertures therethrough between the vanes adapted to permit the outward escape of solid material, and the passage of water jets, substantially as set forth.

In testimony whereof I affix my signature, in the presence of two witnesses.

FRANK H. LINDENBERG.

Witnesses:
DUDLEY T. FISHER,
HARRY C. DEAN.